(No Model.) 5 Sheets—Sheet 1.
C. WHEELER, Jr.
COMBINED HARVESTER AND SELF BINDER.

No. 263,006. Patented Aug. 22, 1882.

Witnesses:
F. L. Durand
R. W. Smith

Inventor:
C. Wheeler Jr.
by A. M. Smith,
Attorney (No Model.)

5 Sheets—Sheet 2.

C. WHEELER, Jr.
COMBINED HARVESTER AND SELF BINDER.

No. 263,006. Patented Aug. 22, 1882.

Witnesses:
F. L. Ourand
R. M. Smith

Inventor:
C. Wheeler Jr.
by A. M. Smith
Attorney (No Model.) 5 Sheets—Sheet 3.

C. WHEELER, Jr.
COMBINED HARVESTER AND SELF BINDER.

No. 263,006. Patented Aug. 22, 1882.

Witnesses:
F. L. Ouraud
R. M. Smith

Inventor:
C. Wheeler Jr.
by A. M. Smith, Attorney (No Model.) 5 Sheets—Sheet 4.

C. WHEELER, Jr.
COMBINED HARVESTER AND SELF BINDER.

No. 263,006. Patented Aug. 22, 1882.

Witnesses:
F. L. Durand.
R. M. Smith

Inventor:
C. Wheeler Jr.
by A. M. Smith,
Attorney.

(No Model.)
C. WHEELER, Jr.
COMBINED HARVESTER AND SELF BINDER.
No. 263,006.
5 Sheets—Sheet 5.
Patented Aug. 22, 1882.
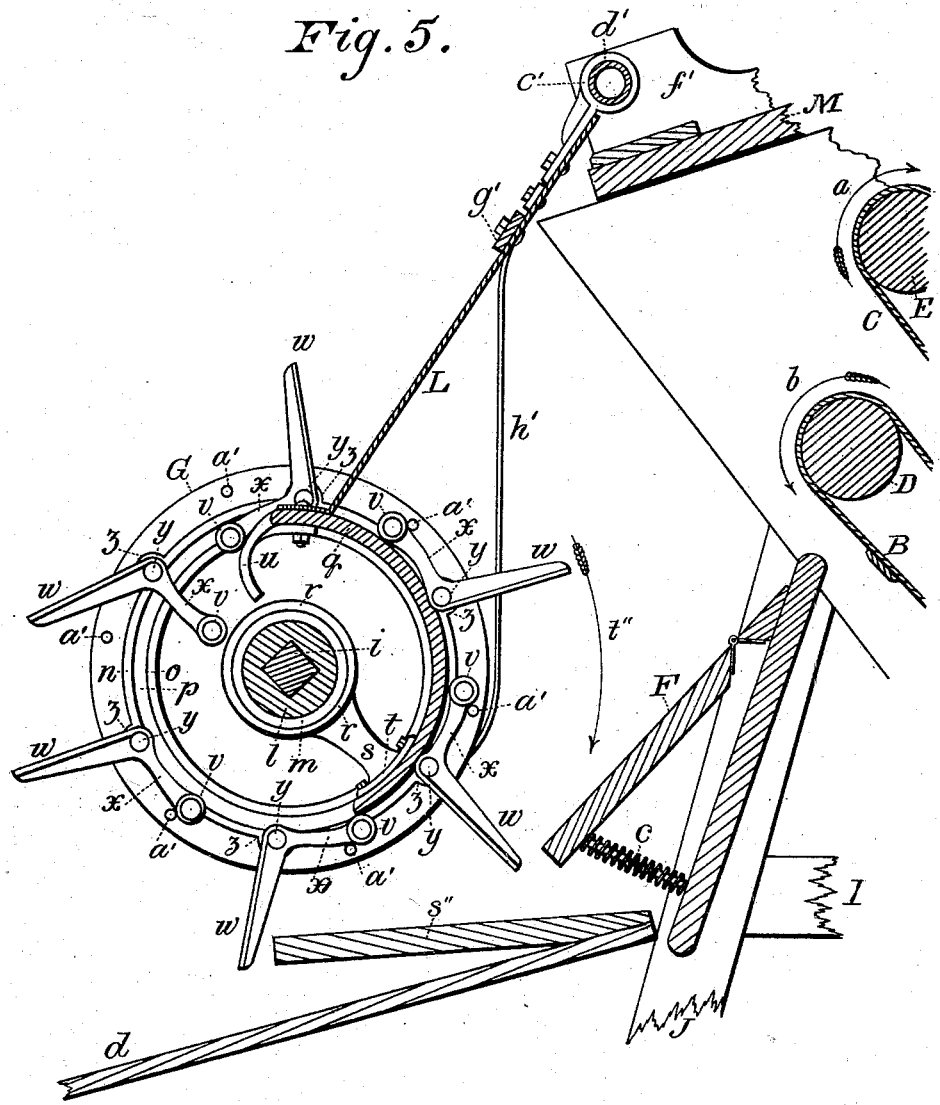
Witnesses:
F. L. Durand
R. M. Smith
Inventor:
C. Wheeler Jr.
by A. M. Smith
Attorney.

UNITED STATES PATENT OFFICE.

CYRENUS WHEELER, JR., OF AUBURN, NEW YORK.

COMBINED HARVESTER AND SELF-BINDER.

SPECIFICATION forming part of Letters Patent No. 263,006, dated August 22, 1882.

Application filed March 11, 1882. (No model.)

*To all whom it may concern:*

Be it known that I, CYRENUS WHEELER, Jr., a citizen of the United States, residing in the city of Auburn, county of Cayuga, State of New York, have invented new and useful Improvements in a Combined Harvester and Self-Binder, of which the following is a full, clear, and exact description, reference being had to the accompanying drawings, making part of this specification, in which—

Figure 1:
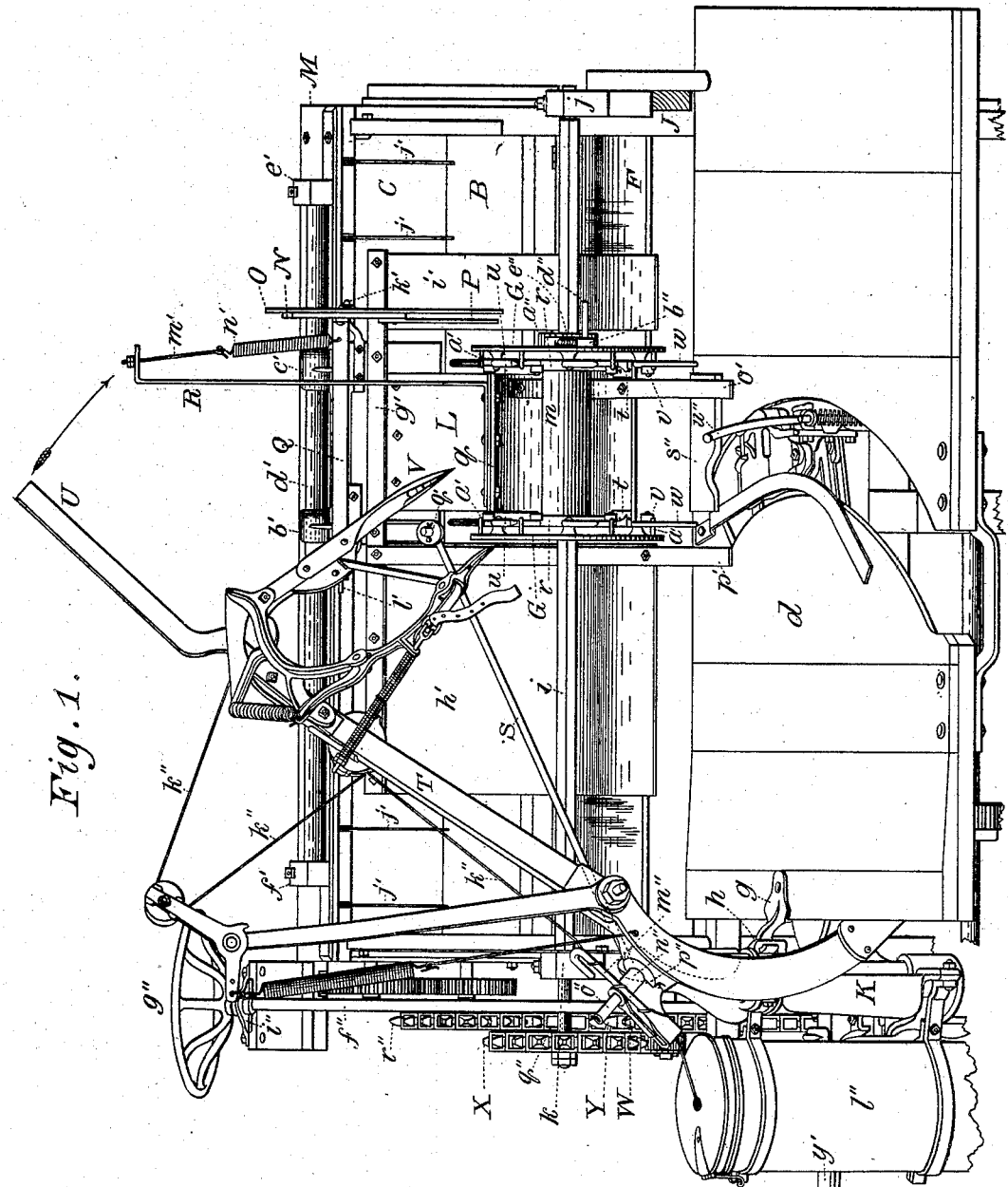
Figure 2:
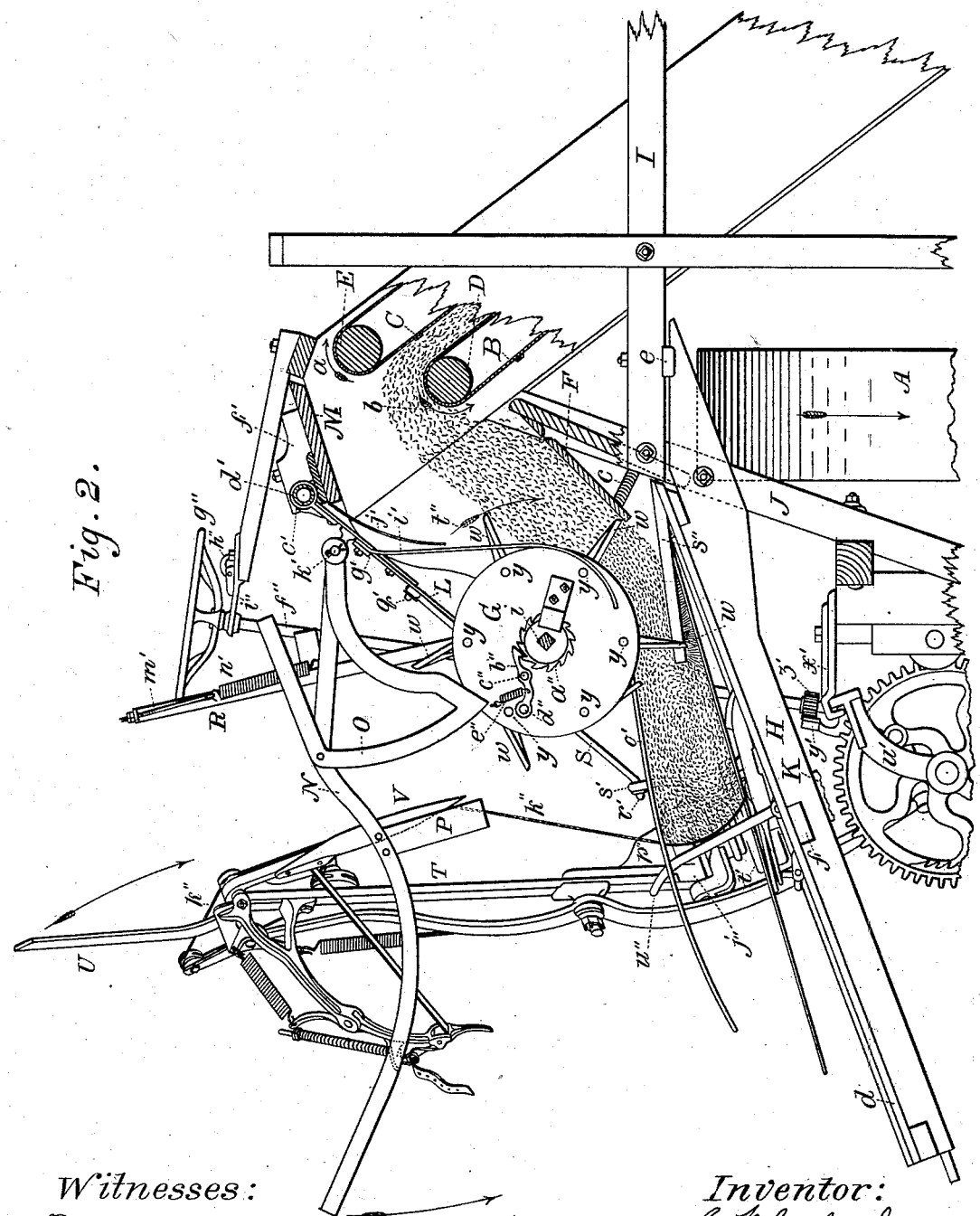
Figure 3:
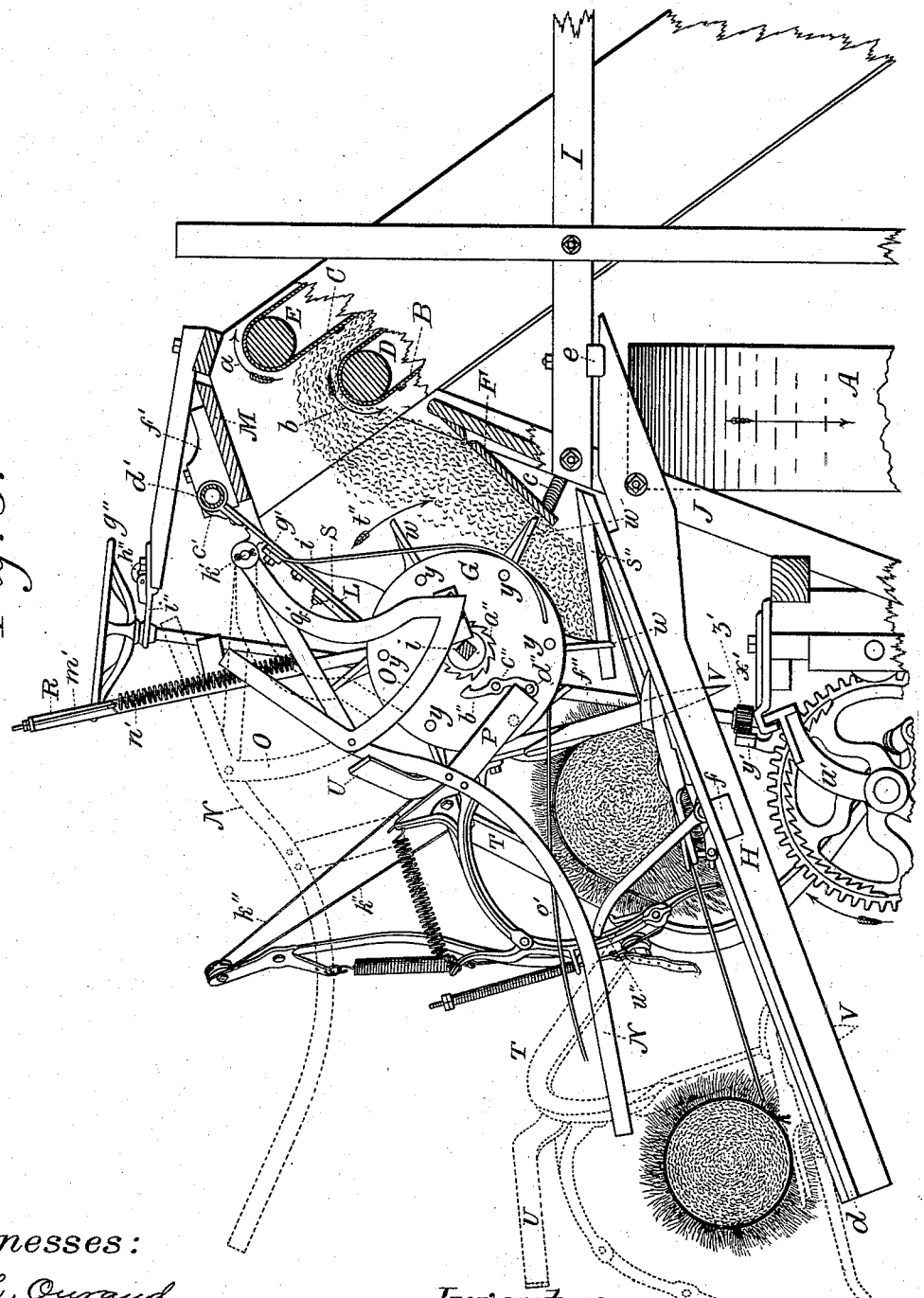
Figure 4:
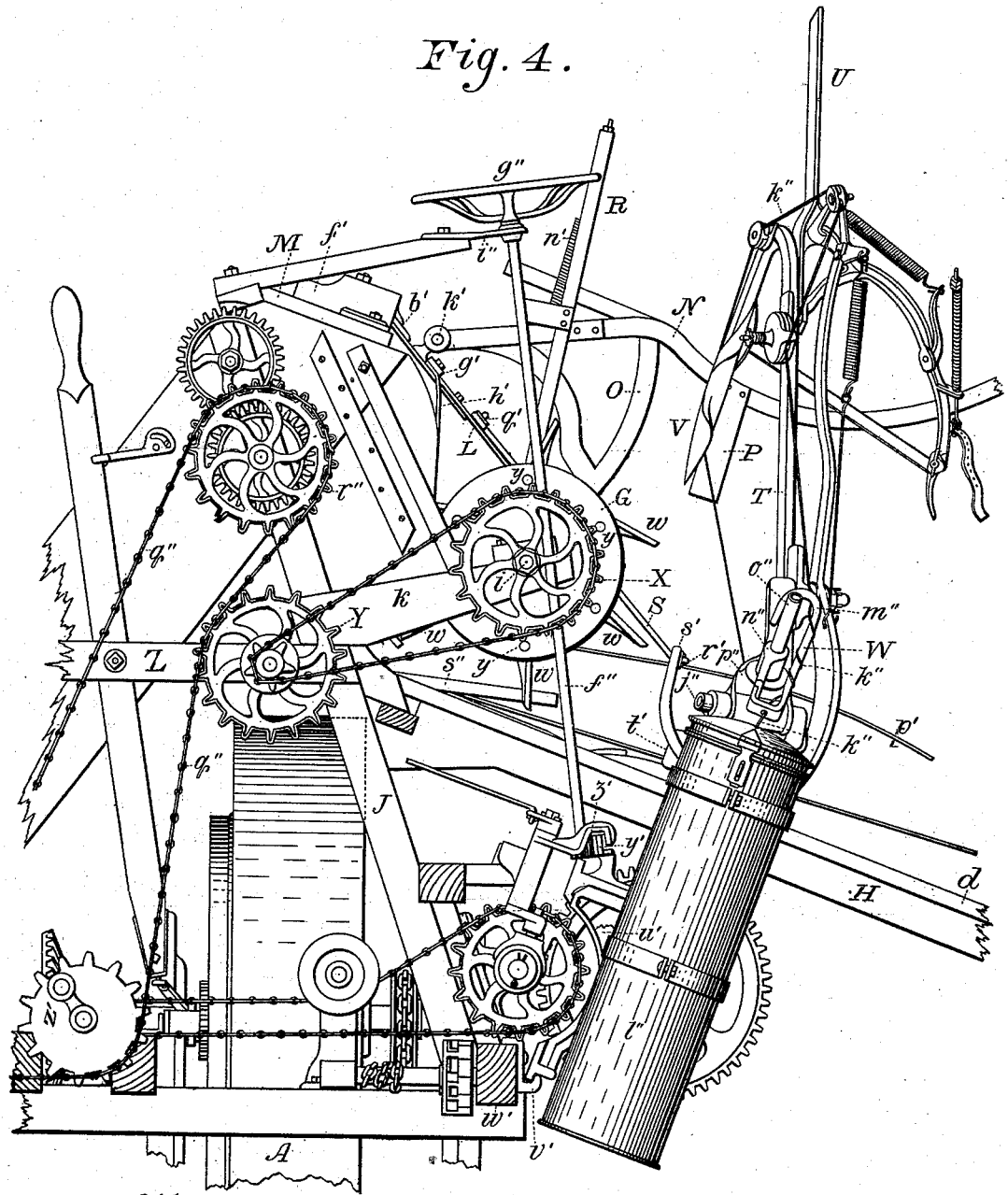

Figure 1 is an elevation, the view being taken from the stubble side of the machine. Fig. 2 is an end view of the same, taken while standing in front of the driving-wheel, a portion of the frame-work being broken away the better to show the rake-in wheel and the position of the grain. Fig. 3 is the same view with the needle and cord-carrying arm down, showing the separation of the bundle from the following grain. Fig. 4 is an end view taken from a position behind the driving-wheel. Fig. 5 is a sectional view of a portion of Fig. 2, being taken through the packer-wheel, and showing the connection of the same with the packing-teeth, its supports, the elevating-aprons, breast-board, and a portion of the binder and grain-receiving table.

Similar letters refer to like parts throughout the several views.

The object of the invention is to produce a more perfect separation of the gavel to be bound from the flowing grain, and to gather and pack the same into compact form, so that it may be compressed and bound into a compact bundle free from any entanglement with the succeeding bundle or gavel, and also to provide a more simple and effectual tension device than heretofore in use.

In the drawings, A represents the driving-wheel, which, as in all harvesters of this type, supports and carries the major part of the cutting apparatus and frame-work and gives motion to the operative machinery.

B represents the lower and C the upper elevating-aprons, and D and E respectively represent the upper rollers, which support said aprons at their ends and impart motion to the same in the direction indicated by the curved arrows $a$ and $b$.

To bring the flowing grain at all times within the grasp of the teeth of the packer-wheel, below the upper ends of the elevating-aprons is hinged the breast-board F, which has behind its lower edge a coil-spring, $c$, which serves to keep said lower edge of the hinged breast-board pressed toward the packer-wheels G, except when an excess of grain forces it back against the tension of the spring.

For the purpose of giving the binding mechanism a smoother, more uniform, and easy motion, and at the same time to facilitate the movement of the grain from the elevating-aprons outward, the top of the binding-arm axis is outwardly inclined, and the receiving and binding table $d$ is inclined downward from its point of connection with the frame-work I, and is supported at its stubble side by the bar H, near the inner end of which said bar is bolted to the post J, its inner end resting in a recessed iron lug-piece, $e$, which is bolted to the under side of the frame-piece I. On this bar H, transversely thereof, the table $d$ can be moved back and forth, the cross-bar $f$ of the table $d$ sliding in a notch in the bar H and serving to keep it from moving longitudinally of the bar. The rear end of the table has a metal hook-piece, $g$, bolted to it, which hooks into an ear, $h$, attached to the rock-shaft stand K of the binder rock-shaft.

As the location of the binding mechanism is placed so that the cord-carrying arm will not reach the grain as it falls from the elevating-aprons, a packing mechanism is interposed between said aprons and the binding mechanism, which consists of a shaft, $i$, supported in bearings formed in the beams $j$ and $k$, which project from and are fastened to the frame-work of the machine on each side of the frame-work which supports the elevator-aprons. This shaft $i$ is of square form in its entire length between its bearings on the beams $j$ and $k$. On said shaft $i$, Fig. 5, is placed a round sleeve-piece, $l$, having a square hole through it slightly larger than the size of the shaft $i$, on which it is free to slide back and forth longitudinally. On this sleeve-piece $l$ is placed another sleeve-piece, $m$, the hole in which is large enough to admit of the sleeve-piece $l$ turning freely therein. To each end of the sleeve-piece $m$ are securely keyed or otherwise fastened head-pieces or packer-wheels G, and in relative position several inches apart. The packer-wheels G have on their inner faces projecting ribs n and o, which form a circular groove or recess, p, between them. In these grooves p are placed the ends of the semicircular shell-piece q, which is slightly less in thickness than the width of the grooves and a trifle less in length than the distance between the inner faces of the two packer-wheels G, so that said wheels may turn freely, without binding, on the ends of the semicircular shell-piece q.

In order that the semicircular shell-piece q may be kept in position, two ring-pieces, r, having arms s and flange-pieces t, are placed on the sleeve-piece m, at each end thereof, and just inside of the packer-wheels G, the flanged ends of said arms s being bolted or riveted firmly to the inner side of the semicircular shell-piece q, near its lower edge. To the upper edge of the said piece q, and at each end, near the packer-wheels G, is fastened a downwardly-curved piece, u, the upper edge of which is flush with the outer circumference of the said piece q, the office of which piece q is to serve as a track on which the rollers v on the arm x of the pivoted teeth w may travel. Each of the packer-wheels G has six teeth, which are so pivoted to the wheel-heads as that a tooth on one shall stand in a direct line with the tooth on the opposite wheel and parallel with the axis of said wheels. These packer-teeth are pivoted to the inner faces of the packer-wheels G by pivots y passing through corresponding bosses or hubs, z, formed on the inner faces of the wheels, and equal in thickness to the depth of the ribs n and o, so that the arms x, which carry the rollers v, may freely swing by said projecting ribs n and o. The rollers v are pivoted to a stud projecting from each of the arms x. Pins a' project from the inner faces of the wheels G, near their edges, and limit the movement of the arms x outward, and thus prevent the packer-teeth and their arms from falling forward by the force of gravity when the teeth are on the descending side of the packer-wheels.

A ratchet-wheel, a'', is fastened to the projecting end of the sleeve-piece l, and to the outside face of one of the packer-wheels G is pivoted the pawl b'' at c''. One end of this pawl has a saw-toothed hook for acting on the ratchet, and its other end has projecting from it, parallel to its pivot, a stem-piece, d'', between which and the pivot c'' is fastened one end of a spiral spring, e'', its other end being connected with the packer-wheel G on its outer face. The action of the spring e'' forces the hooked end of the pawl b'' into the notches of the ratchet-wheel a'', when not otherwise controlled, as will hereinafter be explained.

To insure the gathering of all the grain by the packing-teeth w, a deflecting-board, s'', is fastened to the inner edge of the table d, its outer edge being raised far enough above the surface of the said table to bring the teeth w below its upper surface as they pass by on either side thereof. The deflecting-board s'' is slightly less in width than the space between the teeth of the two packer-wheels G. It also projects forward past the sleeve-piece to which the packer-wheels are fastened, and is notched at its forward edge, so as to permit the needle of the cord-carrying arm to pass down close to said sleeve m. This deflecting-board s'' may be hinged, and have a spring under its front end to give it elasticity, if so desired.

To hold the semicircular shell-piece q from turning with the packer-wheels G, a supporting-piece, L, is attached thereto by its lower end, its opposite or upper end being secured to thimble-pieces b' c', which are arranged to slide freely on the rod d', which is supported at its ends on top of the elevator-frame cap-piece M in bearing-pieces e' and f', which hold it firmly in position. The rod d' is round. For lightness gas-pipe is preferred, as illustrated in the drawings. The supporting-piece L is less in width than the length of the semicircular shell-piece q, to which it is connected, so as to give room for the teeth to pass by it. To the outer side of L a cross-bar, g', is bolted. This cross-bar g' projects on each side of the supporting-piece L, and has fastened to it the shield-pieces h' and i', which extend downward in front of the elevating-aprons B and C and behind the square shaft i of the packing devices, and are curved in shape to conform nearly to the outer circumference of the wheels G, and serve to deflect the flowing grain as it issues from the mouth of the elevating-aprons, and to retain it in position for the effective action of the packer-teeth w upon said grain. Deflecting-wires j' are also hinged to the elevator cap-piece M and aid in a like result.

In order to better effect the separation of the gavel to be bound from the following grain, a stop mechanism is combined with the packing devices, so that when the packing devices have brought forward enough grain to form a bundle they are stopped long enough for the binding mechanism to complete the binding and discharge of the bound bundle. To secure this result a lever, N, is pivoted at k' to the piece L. This lever has connected with it a piece, O, the conformation of which is clearly shown in the drawings. It has also a straight piece, P, riveted to it and projecting downward, as shown, the object of which will be hereinafter explained. This lever N has also a brace, Q, fastened by one end to it, the other end of which is pivoted to the piece L at l' in line with pivot k'. A standard, R, having a foot-piece at right angles to it, is bolted on top of the piece L at the point of its connection with the semicircular shell-piece q. Its upper end is turned in the opposite direction at an angle, and through a hole made in it passes a rod, m', having a thread and screw-nuts for adjustment. The lower end of the rod m' has an eye, to which is connected a spiral spring, n', the lower end of said spring being connected with the brace Q near its point of connection with the lever N. The spring $n'$ serves to hold the lever N in an elevated position when not otherwise controlled, as will presently be explained.

That the gavel may be kept in compact shape and prevented from being carried upward by the teeth of the packer-wheels, the following devices are arranged: To the semicircular shell-piece $q$, and on its inner side, is bolted a rod, $o'$, which projects outward some distance and about parallel to the table $d$, but several inches above it. Another rod, $p'$, is bolted to the shield-piece $h'$ and projects outward in the same manner. These rods may be made of flat steel, to give elasticity to them.

In order that the packing mechanism may be moved back and forth with the binding mechanism in front of the grain-elevating devices, the same are connected together as follows: To the piece L at $q'$ is pivoted one end of the rod S, its other end being pivoted at $r'$ to an ear, $s'$, which is attached to the rock-shaft support $t'$ of the binder.

Motion is imparted to the square shaft $i$ by a sprocket-wheel, X, attached to the rear projecting end thereof, outside of the frame-work. A square link-chain unites this wheel X to the smallest of a double sprocket-wheel, Y, which is supported on a stud-axle fastened to the frame-piece Z. This double sprocket-wheel Y receives motion from the crank-shaft sprocket-wheel $Z'$ through the drive-chain $q''$, which gives motion to the sprocket-wheel $r''$ on the shaft of the lower roller at the upper end of the elevator-apron D.

The binder mechanism, with certain modifications, which will not at present be described, is of the kind and construction shown in another application filed by me, and is fully illustrated by the drawings accompanying the same.

The binder apparatus here shown, instead of being vertical, has the top of the rock-shaft support K and frame-work inclined outward from the harvester, the brace of the frame-work $w'$ preserving its former position in the guide-piece $v'$, attached to the beam $w'$ of the harvester, the upper flange of the binder-frame being held in position by the metal piece $x'$, attached to the harvester-frame. A rack-piece, $y'$, is attached to the binder-frame, and a pinion, $z'$, keyed to the lower end of the shaft $f''$, which has also a hand-wheel, $g''$, on its other end, and within reach of the driver in his seat, serves to move the binding apparatus back and forth to bring the binding-cord at the desired point around the gavel as may be required by the varying length of the straw. A dog, $h''$, is hinged to the supporting-piece $i''$ under the hand-wheel, and serves, when its end is turned up, to hold the hand-wheel from rotating and the binder from moving.

It will be seen by the drawings that while the binder-table $d$ is inclined outward and downward from the harvester the rock-shaft stand K is at right angles to the surface of said table $d$, and that the rock-shaft which said stand supports and which carries the binder-arm T also has its axis at right angles to the binding-table. By this arrangement of the binder mechanism and binder-table in relation to the harvester-frame and elevating-aprons a larger space of binding-table is obtained for receiving and binding the grain without throwing the harvester injuriously out of balance on its driving and supporting wheel A. As will be clearly seen in Figs. 2 and 4, the greater part of the weight of the binding mechanism and its operating apparatus is below the binding-table and outside of the frame-work of the harvester, and if the same were moved outward bodily far enough to give the required space on a horizontal table its weight would be too great, and would tend to overbalance that part of the machine located on the opposite side of the driving-wheel. Another advantage gained is that the largest expenditure of power is required when the binder is performing the operation of binding the bundle and moving the same outward for the purpose of discharging it upon the ground. This inclination of the binder outward, as shown and described, equalizes the power by adding the force of gravity to a portion of the weight of the binder-arm and its attachments, as well as the weight of the bundle to that part of the operation. To the binder or cord-carrying arm T is bolted an extension-piece, U, which, in conjunction with the lever N and its connections on which it acts, serves to control the action of the packer-wheel G. The cord-carrying arm T has a needle end, V, perforated near its point for the passage of the cord through it.

The cord $k''$ is taken from balls stored in a cam, $l''$, attached to the rock-shaft stand K. For the purpose of relieving the cord of kinks and to give it more uniform tension, a tension device, W, is provided, which consists of a round rod of iron having its end $m''$ bent around so as to form a bow, the opposite or rear end being flattened and bent around in a circular manner and fastened to a socket-piece, $n''$, which slides onto the spindle $o''$, which is inserted in the hinged socket-piece $p''$ of the cord-carrying and binding-arm T. The flattened part of W has a hole for the passage of the cord $k''$ through it, which is then passed the required number of times around the round part of W to give the necessary tension. The number of times which the cord can be wound around the rod can be regulated with great facility without unthreading the needle end of the cord-carrying arm, as all that is necessary is to pass the cord more or less times under the rounded or open hook end $m''$ of W.

The binder is provided with the same compressing devices and knot-tying apparatus as described in another application referred to, and its operating mechanism is substantially the same, except as heretofore described.

The operation of my improvements is as follows, (see Figs. 2 and 3:) In the movement of the machine forward motion is imparted to the cutters and the carrying and elevating aprons through the driving and supporting wheel A. The severed grain falls upon the carrying-canvas and is delivered to the elevating-aprons B and C, which discharge it through the opening between them, above the packer-wheels G and the breast-board F. The packer-wheels G having a rotary motion imparted to them in the direction of the arrow $t''$, their teeth $w$ sweep the grain forward until they reach a point just past the outer end of the deflecting-board $s''$, when the rollers $v$ pass off from the lower edge of the semicircular shell-piece $q$, and the pivoted teeth $w$ are free to swing on their pivots, falling back by the resistance of the grain with their points nearly within the periphery of the wheels G, to which they are pivoted, the rods $o'$ and $p'$ confining the grain within the space between them and the table $d$ below. The action of the wheels G and their pivoted teeth $w$ continues upon the grain, packing it first upon the deflecting-board $s''$, and secondly against the upwardly-projecting compressing-finger $u''$ on the knotter-carrying frame, until enough has accumulated to form a bundle, when the driver in his seat throws the binding mechanism into action. As the binding mechanism begins moving the compressing-finger $u''$, carried by the knotter-carrying arm, to which it is attached, presses the grain back and still further compacts it. As the cord-carrying arm descends its extension-piece U strikes the lever N and presses it down until either the piece O or P is brought in contact with the pin or stud $d''$, projecting from the pawl $b''$, thus throwing the pawl out of action with the ratchet-wheel $a''$, and holding the wheels G in a fixed position, the shaft $i$ and sleeve $l$ continuing to rotate. In the drawings, the arm or piece P is shown as acting upon the pawl $b$ to release the packing-wheel; but the arm O may be extended for this purpose, if preferred. This takes place an instant in advance of the point of the needle V reaching the grain. The needle, in its descent, passes down between the wheels G and just in front of the sleeve-piece $m$, to which said wheels are attached. The wheels G, by the action of the lever N and its attachments, are stopped and held in a fixed position, so that the point of the needle passes down in line with the two packer-teeth of the opposite packer-wheels, which are held rigid, and all of the grain back of them there retained, the separation being made at this point between the gavel being bound and the following grain. The wheels are thus held until the gavel is bound and the bundle near the point of discharge from the table $d$, when the extension-piece U passes off from the end of the lever N, the action of the spring $n'$ raises the lever, the pawl $b''$ again acts on the ratchet-wheel $a''$, and the packer-wheels G commence revolving, the accumulated grain being brought forward until enough is again collected to form another bundle, when the binding mechanism is brought into action, as before, by the driver in his seat, and the operation repeated, as described.

The capacity of the packer-wheels is such that any amount of grain that accumulates during the brief stoppage to permit the separation and binding of the gavel is, by the first revolution of the packer-wheels, swept forward, the space between the breast-board and wheels and the mouth of the elevating canvas aprons being large enough to contain any accumulation produced by the stoutest grain during the operation of binding, tying, and discharging the bundle.

The extreme movements and positions of the binding or needle arm and its attachments and of the packer-stopping mechanism are indicated in dotted lines in Fig. 3, Sheet 3.

It will be observed that the driver can, by means of the hand-wheel $g''$, move the binding mechanism back and forth at pleasure, so that the binding-arm will pass the cord around the gavel at the proper point to properly secure and hold the gavel when bound into a bundle, this point being determined by the length of the straw. In thus moving the binder and the binding-table back and forth the driver will also move the raking mechanism, which is arranged to slide freely on the square shaft $i$ and the hollow rod $d'$, the binding devices and table being connected to the raking mechanism by the link-rod S.

Having thus fully described the construction and operation of my improvements, I will now point out what I believe to be new and desire to secure by Letters Patent, and which is set forth in the following claims:

1. In combination with the elevating devices of a harvester, arranged to deliver the cut grain above and over the driving-wheel, an inclined binder-table receiving the grain therefrom, and a swinging and vibrating binder-arm hinged to an inclined rock-shaft whose axis is at right angles to the inclined surface of said table, whereby the gravity of said arm and of the grain is made to assist in the operation of binding the bundle, substantially as described.

2. The combination, with mechanism for elevating the grain over the driving-wheel, of the inclined binder-table, the swinging and vibrating binder-arm pivoted to a rock-shaft perpendicular to said table, an intermittent packing mechanism working above said table between the elevating and binding mechanisms, and outwardly-projecting rods supported above said table, all arranged and operating substantially as described.

3. The combination of the inclined binder-table, a swinging and vibrating binder-arm hinged to a shaft perpendicular to said table, an adjustable packing mechanism working above said table, the outwardly-projecting rods arranged above said table, and adjustable with the table and said packing mechanism, and a compressing-finger hinged to and carried by the knotter-carrying arm and working below said table, substantially as described.

4. In combination with the grain-elevating devices of a harvester, and an adjustable binding-table receiving the grain therefrom, a packing mechanism working above said table and adjustable therewith, and a hinged and yielding breast-board for holding the grain up to the action of said packing mechanism, substantially as described.

5. The combination of the double elevating-aprons, the inclined binder-table, the packing mechanism arranged to work above said table and to move the grain outward thereon, and the binding mechanism, with its horizontally-swinging vertically-oscillating binder-arm working on the outer side of said packer, and adapted to carry the cord from the outer side of said table over the gavel, and to bring the strands of the cord together below the table, said parts being arranged and operating substantially as described.

6. The lever N, in combination with the packer-wheels G and the extension-piece U on the binder-arm, substantially as and for the purpose described.

7. The grooved packer-wheels G, provided with the pivoted teeth $w$, in combination with the semi-cylindrical shell-piece $q$, provided with the pendent curved arms $u$, arranged and operating substantially as described.

8. The packing device provided with the semi-cylindrical shell-piece $q$, connected by an arm, L, and sleeve or thimble with the longitudinal rod $d'$, permitting its adjustment, substantially as described.

9. The combination, with the shaft $i$, of the sleeve $l$, packer-wheels G, ratchet-wheel $a''$, and pawl $b''$, arranged and operating substantially as described.

10. The combination of the packer-wheels G, the ratchet-wheel $a''$, the spring-pawl $b''$, and the lever N, provided with the arm P, arranged and operating substantially as described.

11. The combination, with the packer-wheels G, of the ratchet-wheel $a''$, the spring-pawl $b''$, the lever N, having the arm P, and the needle-arm T, provided with the extension-piece U, arranged and operating substantially as described.

12. The packer-wheel shaft connected through suitable mechanism with and receiving a continuous rotary motion from the endless chain actuating the elevating mechanism, in combination with the packer-wheel provided with pivoted packing-teeth and mounted loosely on said shaft, and mechanism adapting said wheel to receive an intermittent rotary motion therefrom, substantially as described.

13. The tension device consisting of a round rod having one of its ends bent to form an open hook, its opposite end being flattened and bent at a right angle to the body of the rod, and provided with a perforation for the passage of the cord and a socket for attaching it to its support, substantially as described.

14. The tension device W, provided with the socket-piece $n''$, in combination with a pivotal support attached to the pivotal socket-piece $p''$, connecting the binder-arm with its vibrating shaft or pivot, substantially as described.

In testimony whereof I have hereunto set my hand this 28th day of February, A. D. 1882.

C. WHEELER, Jr.

Witnesses:
T. J. SEARLS,
S. C. TITUS.